United States Patent
Switkes et al.

(10) Patent No.: US 9,291,106 B2
(45) Date of Patent: Mar. 22, 2016

(54) CAM PHASER CONTROL

(71) Applicant: Tula Technology, Inc., San Jose, CA (US)

(72) Inventors: Joshua P. Switkes, Menlo Park, CA (US); Xin Yuan, Palo Alto, CA (US); Matthew A. Younkins, San Jose, CA (US)

(73) Assignee: TULA TECHNOLOGY, INC., San Jose, CA (US)

( * ) Notice: Subject to any disclaimer, the term of this patent is extended or adjusted under 35 U.S.C. 154(b) by 424 days.

(21) Appl. No.: 13/842,234

(22) Filed: Mar. 15, 2013

(65) Prior Publication Data
US 2014/0277999 A1    Sep. 18, 2014

(51) Int. Cl.
*F02D 13/02* (2006.01)
*F02D 13/06* (2006.01)
(Continued)

(52) U.S. Cl.
CPC ............ *F02D 13/0219* (2013.01); *F01L 1/344* (2013.01); *F02D 13/06* (2013.01);
(Continued)

(58) Field of Classification Search
CPC .......... F02D 2041/001; F02D 41/0002; F02D 13/0215; F02D 13/0234; F02D 13/0238; F02D 13/0219; F02D 13/0249; F02D 13/0269; F02D 17/02; F02D 41/0087; F02D 13/0246; F02D 13/0257; F02D 2250/18; F02D 31/002; F02D 41/0085; Y02T 10/18; F01L 1/34; F01L 1/3442; F01L 2001/0537; F01L 2800/00; F01L 2001/34483; F01L 13/0036; F01L 2001/34496; F01L 2001/34426; F01L 2001/3443; F01L 2001/34479; F01L 2820/043; F01L 13/0005; F01L 13/0015; F01L 2013/001; F02B 1/04; F02B 2275/18; F02B 77/082

USPC ............ 701/101, 102, 105, 84; 123/321, 322, 123/345, 346, 347, 348, 355, 369, 370, 371, 123/372, 373, 374, 681, 683, 682, 54.3, 123/55.3, 56.2, 56.9, 406.18, 406.58, 90.16, 123/90.17, 90.18, 90.31, 90.34, 90.44, 90.6, 123/481, 198 F, 406.2, 406.23, 691, 692
See application file for complete search history.

(56) References Cited

U.S. PATENT DOCUMENTS 4,434,767 A  3/1984  Kohama et al.
4,489,695 A  12/1984  Kohama et al.
(Continued)

OTHER PUBLICATIONS

Markus, Frank, "Ford Gets Phased Using Free Energy," Motor Trend, Nov. 11, 2008, http://blogs.motortrend.com/ford-gets-phased-using-free-energy-2105.html#axzz2SuShm1PO.
(Continued)

*Primary Examiner* — Hai Huynh
*Assistant Examiner* — John Bailey
(74) *Attorney, Agent, or Firm* — Beyer Law Group LLP (57) ABSTRACT

Arrangements for stabilizing valve timing adjustment mechanisms such as cam phasers during operation of an engine are described. The described approaches are particularly well suited for use during skip fire control, although they may be used advantageously in other applications as well. In general, the phase of an adjustable phase camshaft is controlled relative to a crankshaft of an engine. In one aspect, at least one of (i) firing events in a skip fire firing sequence, and (ii) dynamically determined valve actuation events are used in the control of the camshaft phase during operation of the engine. In some embodiments, hydraulic pressure within a cam phaser is varied in a manner that maintains the phase of the camshaft substantially more stable through transitory variations in torque applied to the camshaft by the actuation of the valves than would occur without the variations in hydraulic pressure.

15 Claims, 4 Drawing Sheets

(51) Int. Cl.
  *F02D 41/00* (2006.01)
  *F01L 1/344* (2006.01)
  *F01L 13/00* (2006.01)

(52) U.S. Cl.
  CPC ......... *F02D41/0087* (2013.01); *F01L 1/34409* (2013.01); *F01L 2013/001* (2013.01); *F01L 2800/00* (2013.01); *F01L 2800/15* (2013.01); *F01L 2820/01* (2013.01); *F02D 2041/001* (2013.01); *F02D 2041/0012* (2013.01); *Y02T 10/18* (2013.01)

(56) References Cited

U.S. PATENT DOCUMENTS

| | | | |
|---|---|---|---|
| 4,509,488 A | 4/1985 | Forster et al. | |
| 5,040,500 A | 8/1991 | Reece | |
| 5,377,631 A | 1/1995 | Schechter | |
| 5,408,966 A | 4/1995 | Lipinski et al. | |
| 5,417,187 A * | 5/1995 | Meyer | F01L 1/34 123/90.15 |
| 5,529,034 A * | 6/1996 | Sone | F01L 1/34406 123/90.15 |
| 5,924,395 A * | 7/1999 | Moriya | B60K 6/46 123/179.18 |
| 6,006,707 A * | 12/1999 | Ito | F01L 1/34406 123/90.15 |
| 6,079,381 A * | 6/2000 | Morikawa | F01L 1/34 123/90.15 |
| 6,129,062 A * | 10/2000 | Koda | F01L 1/34 123/90.17 |
| 6,158,411 A | 12/2000 | Morikawa | |
| 6,257,184 B1 * | 7/2001 | Yamagishi | F01L 1/34 123/90.15 |
| 6,619,258 B2 | 9/2003 | McKay et al. | |
| 6,832,583 B2 * | 12/2004 | Hayman | F02D 13/0207 123/90.15 |
| 6,915,775 B2 * | 7/2005 | Patterson | F02D 17/02 123/198 DB |
| 6,978,746 B2 * | 12/2005 | Kibler | F01L 1/34 123/90.12 |
| 7,004,128 B2 * | 2/2006 | Majima | F01L 1/34 123/90.15 |
| 7,063,062 B2 | 6/2006 | Lewis et al. | |
| 7,066,136 B2 | 6/2006 | Ogiso | |
| 7,086,386 B2 | 8/2006 | Doering | |
| 7,107,965 B2 * | 9/2006 | Pozar | F02D 41/0002 123/406.47 |
| 7,131,425 B2 * | 11/2006 | Ramappan | F01L 1/3442 123/406.21 |
| 7,133,763 B2 | 11/2006 | Yasui | |
| 7,231,895 B2 * | 6/2007 | Haffelder | F01L 1/34 123/90.15 |
| 7,246,583 B2 * | 7/2007 | Cinpinski | F01L 1/3442 123/198 F |
| 7,314,027 B2 * | 1/2008 | Murata | F01L 13/0063 123/90.16 |
| 7,698,935 B2 * | 4/2010 | Dibble | F01L 1/18 73/114.79 |
| 7,861,682 B2 | 1/2011 | Berger | |
| 7,908,913 B2 * | 3/2011 | Cinpinski | F01L 1/3442 73/114.79 |
| 7,921,710 B2 * | 4/2011 | Cinpinski | F01L 1/245 73/114.77 |
| 7,930,087 B2 | 4/2011 | Gibson et al. | |
| 8,047,065 B2 * | 11/2011 | Cinpinski | F01L 1/34 73/114.79 |
| 8,061,190 B2 | 11/2011 | Mezger et al. | |
| 8,099,224 B2 | 1/2012 | Tripathi et al. | |
| 8,181,508 B2 * | 5/2012 | Cinpinski | F01L 1/3442 73/114.79 |
| 8,215,285 B2 * | 7/2012 | Nakamura | F01L 1/022 123/346 |
| 8,919,323 B2 * | 12/2014 | Kar | F02D 41/1497 123/352 |
| 2003/0106524 A1 * | 6/2003 | Glugla | F02B 75/22 123/336 |
| 2004/0031457 A1 * | 2/2004 | Kawamura | F01L 1/022 123/90.16 |
| 2005/0000480 A1 * | 1/2005 | Yasui | F01L 1/08 123/90.16 |
| 2007/0006830 A1 * | 1/2007 | Yasui | F01L 1/08 123/90.15 |
| 2009/0025668 A1 * | 1/2009 | Matsusaka | F01L 1/3442 123/90.17 |
| 2009/0107434 A1 * | 4/2009 | Berger | F01L 1/047 123/90.31 |
| 2009/0205889 A1 * | 8/2009 | Leone | B60W 10/06 180/65.265 |
| 2009/0308338 A1 * | 12/2009 | Tashiro | F01L 1/047 123/90.6 |
| 2010/0180857 A1 * | 7/2010 | Yokoyama | F01L 1/053 123/198 F |
| 2010/0204906 A1 * | 8/2010 | Russell | F02D 13/02 701/103 |
| 2010/0280739 A1 * | 11/2010 | Rollinger | F01L 1/34 701/102 |
| 2010/0319639 A1 * | 12/2010 | Morishima | F01L 1/352 123/90.15 |
| 2011/0030657 A1 * | 2/2011 | Tripathi | F02D 17/02 123/481 |
| 2012/0031357 A1 * | 2/2012 | Ervin | F02D 41/1498 123/90.11 |
| 2013/0245921 A1 * | 9/2013 | Glugla | F02D 41/0085 701/105 |
| 2013/0247850 A1 * | 9/2013 | Matsuo | F01L 1/34 123/90.11 |
| 2013/0291816 A1 * | 11/2013 | Serrano | F01L 1/344 123/90.17 |
| 2014/0076251 A1 * | 3/2014 | Matsuo | F02D 41/062 123/90.15 |
| 2014/0216373 A1 * | 8/2014 | Church | F01L 1/3442 123/90.15 |

OTHER PUBLICATIONS

Unknown, "Cam Torque Activated Phasers," BorgWarner, printed May 5, 2013, http://www.borgwarner.com/en/MorseTEC/products/Pages/Cam-Torque.aspx.

* cited by examiner

CAM PHASER CONTROL

BACKGROUND

The present invention relates generally to the control of devices that facilitate variable cam timing during operation of an internal combustion engine such as cam phasers. The invention is particularly applicable to control of such devices during skip fire operation of an engine.

In most engines that utilize a camshaft to drive the operation of intake and exhaust valves, the camshaft is coupled to the engine crankshaft by a synchronizing mechanism such as a timing belt, a timing chain or a geared connection. Such mechanisms ensure that the timing of the opening and closing of the intake and exhaust valves are synchronized with the movements of pistons that drive the crankshaft. Traditionally, the connection between the crankshaft and camshaft was fixed, and therefore the valve timing was fixed. Although such fixed valve timing works well, it is well understood that the engine's performance and fuel efficiency can be enhanced by varying the valve timing as a function of certain current operating conditions such as engine speed and load. Therefore, over the years, a number of devices have been developed which are designed to facilitate the adjustment of the timing of the intake and/or exhaust valves during operation of an internal combustion engine. Some of these devices are arranged to adjust the rotational angle (i.e. phase) of a camshaft (and therefore any cam lobes carried thereon) relative to a crankshaft. Changing the phase of a camshaft relative to the crankshaft inherently adjusts the timing of the valves controlled by that camshaft.

One valve timing adjustment device that is popular today is known as a cam phaser. Although their designs vary, cam phasers are generally hydraulic or electric based devices. Hydraulic cam phasers tend to utilize two concentric parts with a hydraulic fluid (typically engine oil) introduced into a phaser cavity therebetween in order to control the phase of the camshaft relative to the crankshaft. The cam phaser typically includes electronically controlled hydraulic valves that direct high-pressure engine oil into the phaser cavity. Most often, a pulse width modulation (PWM) controlled solenoid is arranged to move a spool valve that regulates the flow of oil into the phaser cavity. Changing the hydraulic pressure within the phaser cavity causes a slight rotation of the camshaft relative to the cam phaser housing (and thus the crankshaft), which results in the valve timing being advanced or retarded in accordance with the rotation (phase shift) of the camshaft. A powertrain control module or engine control unit (ECU) can be arranged to adjust the camshaft timing based on factors such as the engine load and engine speed (i.e. RPM). This allows for more optimum engine performance, reduced emissions and increased fuel efficiency compared to engines with fixed camshafts. Although cam phasers work quite well for their intended purposes, they inherently introduce a certain amount of elasticity into the camshaft control.

The applicant has developed a skip fire engine control technology that is well-suited for improving the fuel efficiency of internal combustion engines. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

During simulation and testing of skip fire control on vehicles that utilize cam phasers the applicant has observed that skip fire operation can cause unintended fluctuations in the cam phasing and therefore the valve timing. Such fluctuations can vary the amount of air introduced into the engine working chambers (cylinders) which can potentially negatively affect engine performance and/or fuel efficiency. Therefore, control schemes and/or devices that provide improved control over various valve timing adjustment mechanisms such as cam phasers would be desirable.

SUMMARY

A variety of methods and devices for stabilizing valve timing adjustment mechanisms such as cam phasers during operation of an engine are described. The described approaches are particularly well suited for use during skip fire control, although they may be used advantageously in other applications as well. In general, the phase of an adjustable phase camshaft is controlled relative to a crankshaft of an engine. In one aspect, (i) firing events in a skip fire firing sequence, and/or (ii) dynamically determined valve actuation events are used in the control of a cam adjusting mechanism. In a specific cam phaser embodiment, the hydraulic pressure within the cam phaser is controllably varied in a manner that maintains the phase of the camshaft substantially more stable through transitory variations in torque applied to the camshaft by the actuation of the valves than would occur without the controlled variations of the hydraulic pressure.

In another aspect an estimated applied camshaft torque is dynamically calculated during operation of the engine in a manner that tracks and accounts for transitory torque variations imparted by various valve actuation events. That estimated torque may then be used in the control of the hydraulic pressure within a cam phaser (or in the control of other valve timing control mechanisms) during engine operation to counteract the transitory torque variation in a manner that holds the camshaft more stable through the transitory camshaft torque variations that occur during operation of the engine. This approach is particularly useful in engines operated in a skip fire manner with valve deactivation.

Various devices for accomplishing such control are also described.

BRIEF DESCRIPTION OF THE DRAWINGS

The invention and the advantages thereof, may best be understood by reference to the following description taken in conjunction with the accompanying drawings in which.

DETAILED DESCRIPTION OF THE PREFERRED EMBODIMENTS

Figure 1:
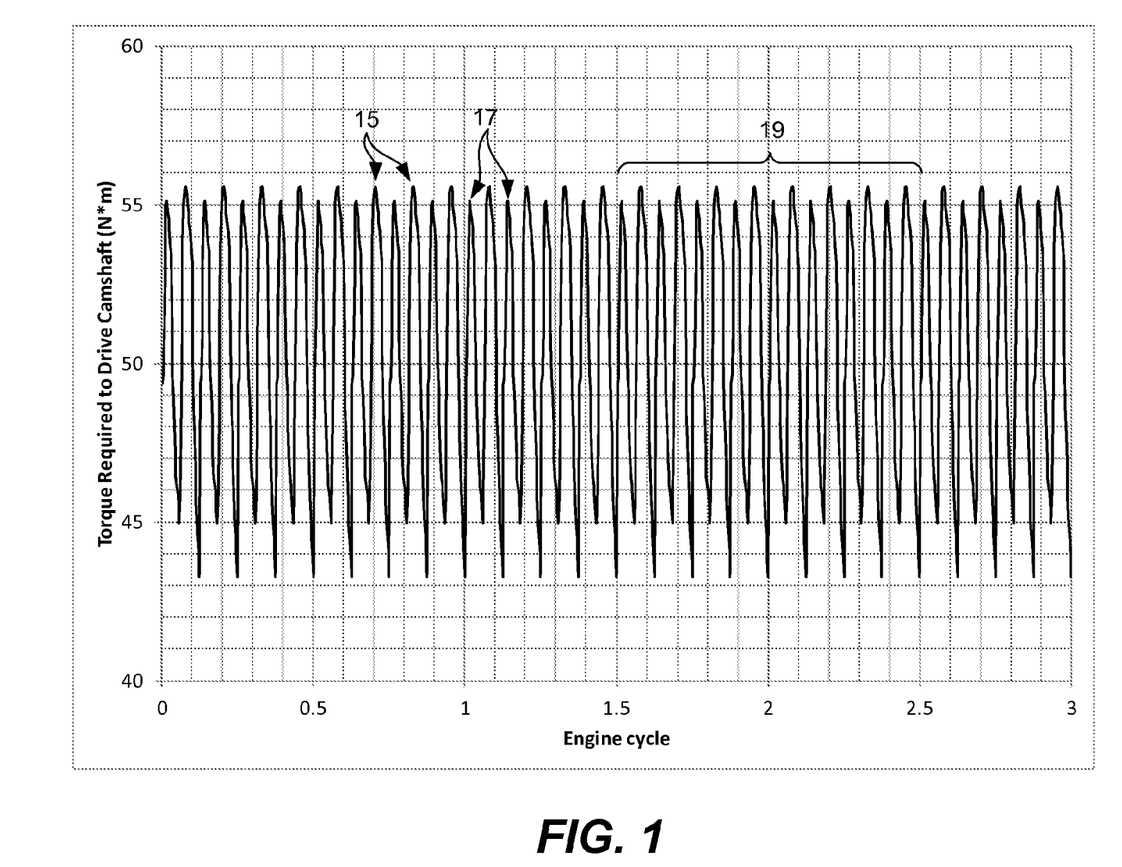
FIG. 1 is a graph that illustrates variations in camshaft torque that might be observed during operation of an eight cylinder engine operating in a normal, all cylinder, firing mode at a representative engine speed and load as a function of the rotational position of the camshaft.

FIG. 1 is a graph that illustrates variations in the torque on the camshaft caused primarily by the dynamics of valve opening and closing that might be observed during operation of an eight cylinder engine operating in a normal, all cylinder firing mode at a representative engine speed of 1500 RPM. The rotational position of the engine is represented in engine cycles, with each engine cycle representing a period in which all eight cylinders are fired (i.e., one rotation of the camshaft and two rotations of the crankshaft for the represented 4-stroke piston engine). In the simulated example, the torque variation imparted to the camshaft appears as a relatively high frequency torque oscillation of something in the range of 12-13 N-m. The oscillation includes a series of major peaks 15 which are each followed by a corresponding minor peak 17. Bracketed region 19 represents the period associated with the firing of all eight cylinders (i.e., one engine cycle or one full rotation of the camshaft) and it can be see that there are eight major peaks and eight minor peaks associated with each engine cycle. This torque signature is relatively independent of engine load. Changes in the cam phaser setting shift the torque signature in phase, but also do not significantly impact the pattern.

Figure 2:
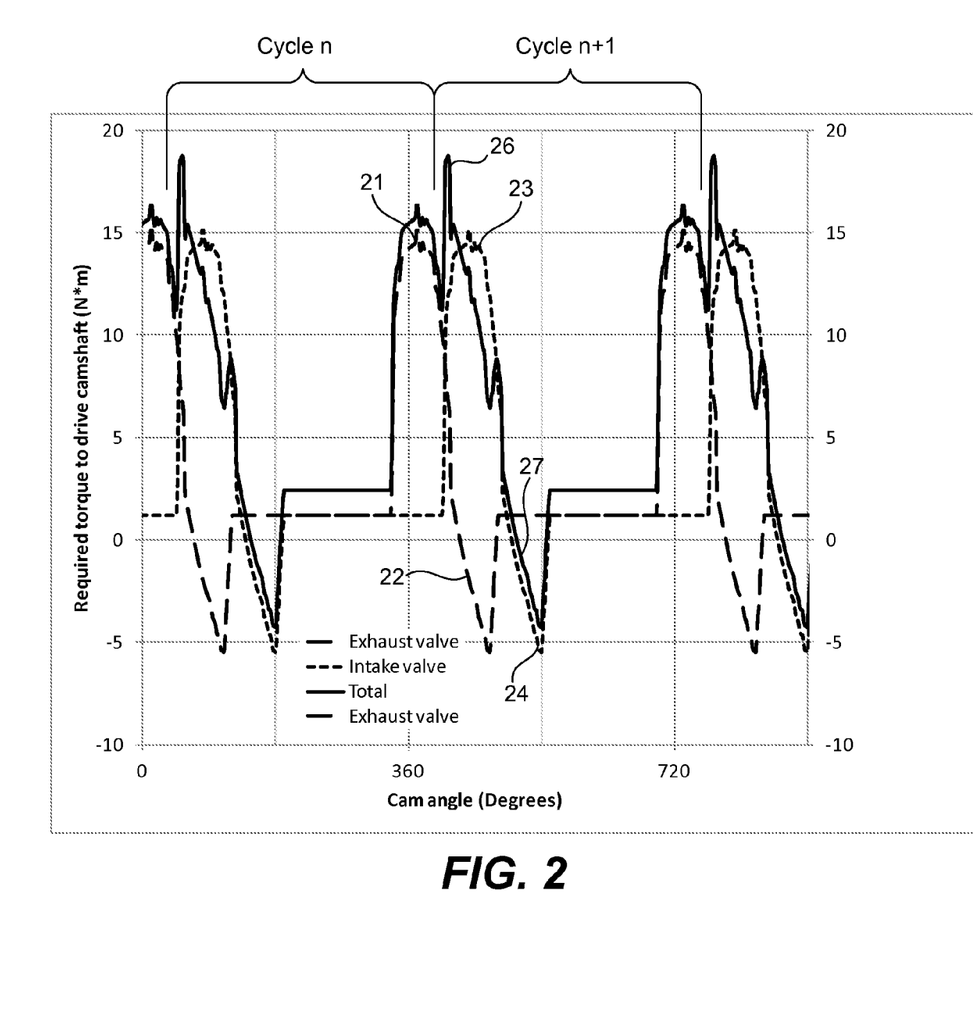
FIG. 2 is a graph illustrating the variations in camshaft torque that might be applied by actuation of the exhaust and intake valves associated with a single cylinder during operation of an engine.

The biggest contributors to the variable torque experienced by the camshaft is the opening and closing of the various valves. FIG. 2 illustrates the torque imparted to the camshaft by the valves associated with a single cylinder. In the illustrated embodiment, the camshaft drives one intake valve and one exhaust valve for the cylinder being considered. In the drawing, the torque associated with the exhaust valve is illustrated in dashed lines, the torque associated with the intake valve is illustrated in dotted lines and the total cumulative torque is illustrated by the solid line.

An exhaust valve opening event causes a corresponding exhaust peak 21 in the exhaust valve imparted torque immediately followed by a valley 22 which corresponds to the closing of the exhaust valve. Similarly, an intake valve opening event causes a corresponding intake peak 23 in the intake valve imparted torque immediately followed by a valley 24 which corresponds to the closing of the intake valve. The net torque has a peak 26 that occurs at a time when both valves are actuated and a valley 27 that corresponds with the closing of the intake valve, at which point a negative net torque is imparted to the camshaft.

It should be appreciated that the overlapping exhaust and intake event peak pair 21 and 23 are associated with different working cycles of the same cylinder. That is, the intake event is associated with the next working cycle of the same cylinder that follows the exhaust event's working cycle. Looking at the graph, it can be seen that the exhaust and intake valve opening events associated with a single cylinder tend to significantly vary the net camshaft torque for over one half the period of each camshaft rotation.

When the combined torques imparted by the valves associated with all of the cylinders are added during all cylinder operation of the engine, the result is the combined torque shown in FIG. 1. Although the magnitude, shape and frequency of the torque oscillations will vary with various engine characteristics and operating conditions, the pattern tends to be relatively consistent at any steady operational state and the frequency of the major oscillations is synchronized with the frequency of the cylinder firings. Thus, even if there are some camshaft phase oscillations that follow the torque oscillations, the valve opening and closing events occur at similar phases of that oscillation for each firing.

Figure 3:
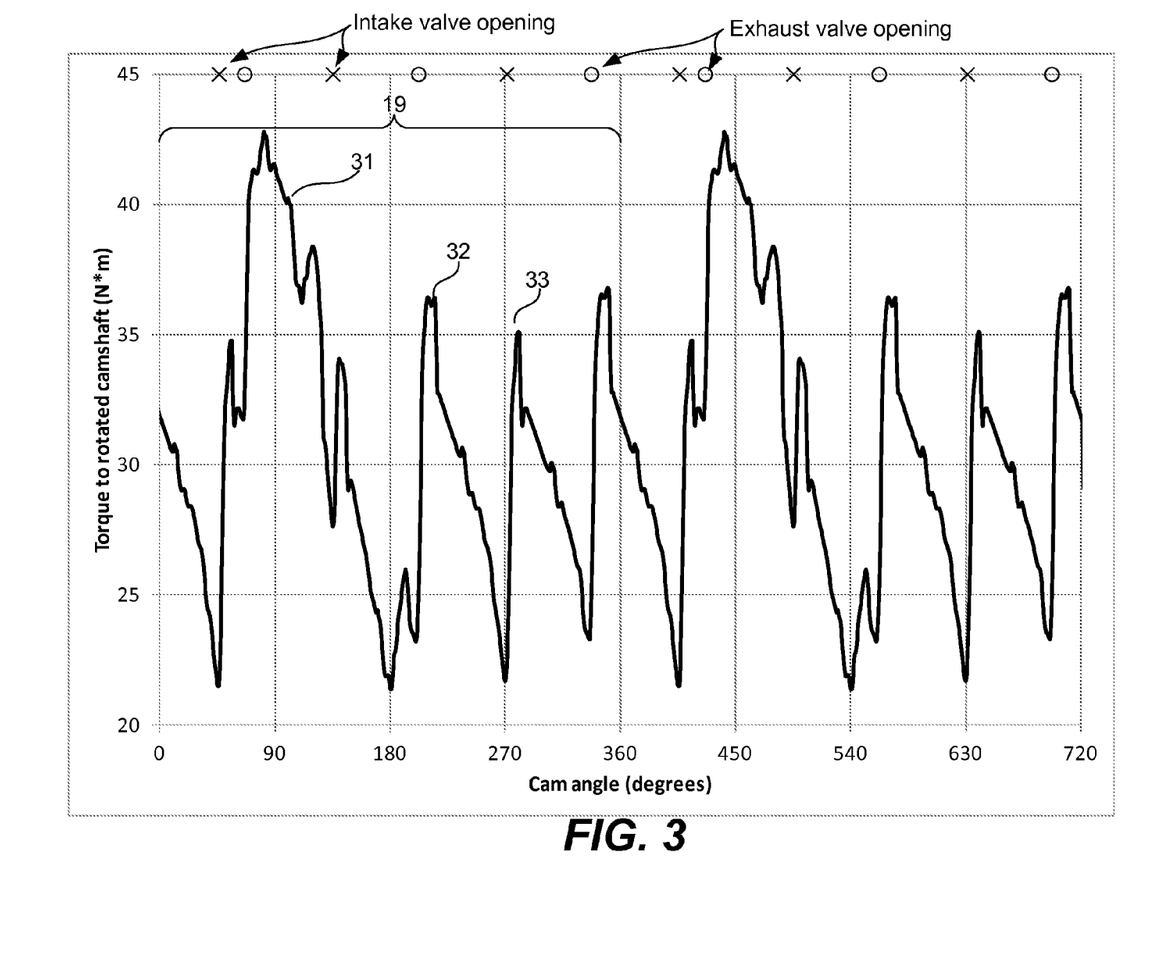
FIG. 3 is a graph that illustrates variations in camshaft torque that might be observed during operation of an eight cylinder engine operating in a skip fire mode at a representative engine speed and load as a function of the rotational position of the camshaft.

In contrast, FIG. 3 is a graph illustrating the camshaft torque variations that might be observed during operation of an eight cylinder engine operated in a skip fire mode at similar engine speed, load and camshaft phase advance conditions as shown in FIG. 1. In the illustrated example, a firing fraction of ⅜ is used and the graph illustrates the firings associated with just a small segment of the firing sequence. Since a ⅜ firing fraction is shown, the torque signature repeats every engine cycle. However, it should be appreciated when some other firing fractions are used, the camshaft torque signature associated with each engine cycle may look quite different. In the illustrated sequence, there are a plurality of major torque peaks 31 and a number of smaller torque peaks 32 and 33. However, there are several noticeable differences between the graph of FIG. 3 and FIG. 1. For example, it can readily be seen that the torque peaks are not always the same magnitude. Furthermore, in the illustrated example, there are fewer torque peaks per engine cycle 19. This is because there are no valve actuations associated with skipped working cycles, so in general there may be larger gaps between peaks. It can also be seen that while the overall magnitude of the torque seen by the camshaft is lower, the magnitude of the torque oscillations is significantly larger. Specifically, in the example of FIG. 3, the combined torque range varies in the range of approximately 22-43 N-m (a variation of on the order of 20-21 N-m), whereas in the example of FIG. 1, the combined torque was in the range of 43-51 N-m (a variation on the order of 12-13 N-m). Of course, the nature of the torque oscillations will vary significantly with variations in the firing sequence.

In FIG. 3, an "X" at the top of the graph indicates the general timing of the beginning of an intake valve actuation and an "O" indicates the general timing of the beginning of an exhaust valve actuation. Thus, it can be seen that peaks 32 generally correspond to somewhat independent exhaust valve actuation events and peaks 33 generally relate to independent intake valve actuation events. The major peaks 31 correspond to a closely bunched set of valve actuations—in this case, the relatively rapid successive actuation of a first intake valve, followed by an exhaust valve, followed by a second intake valve.

When a cam phaser (or other device having elasticity) is used to facilitate variations in the cam phase, the varying reaction torque applied to the camshaft will cause fluctuations in the resultant phase of the camshaft. Various experiments and simulations performed by the Applicant have shown that camshaft phase variations on the order of 2-3 degrees, which translates to valve timing variations relative to the crankshaft on the order of 4-6 degrees, are not uncommon during skip fire operation using conventional control of cam phasers. As will be appreciated by those familiar with the art, such variations will cause corresponding variations in the amount of air introduced to the cylinders and can cause difficulty with fueling (i.e., the introduction of too much, or too little fuel for the amount of air inducted into the cylinder) and corresponding performance and emissions effects. Furthermore, variations of the exhaust valve timing can cause fluctuations in the exhaust flow. This can change the sound of the exhaust and/or the amount of exhaust trapped in the cylinder. Variations in the amount of exhaust trapped in a cylinder effects the combustion and the amount of fresh air introduced to the cylinder during the following intake event.

Figure 4:
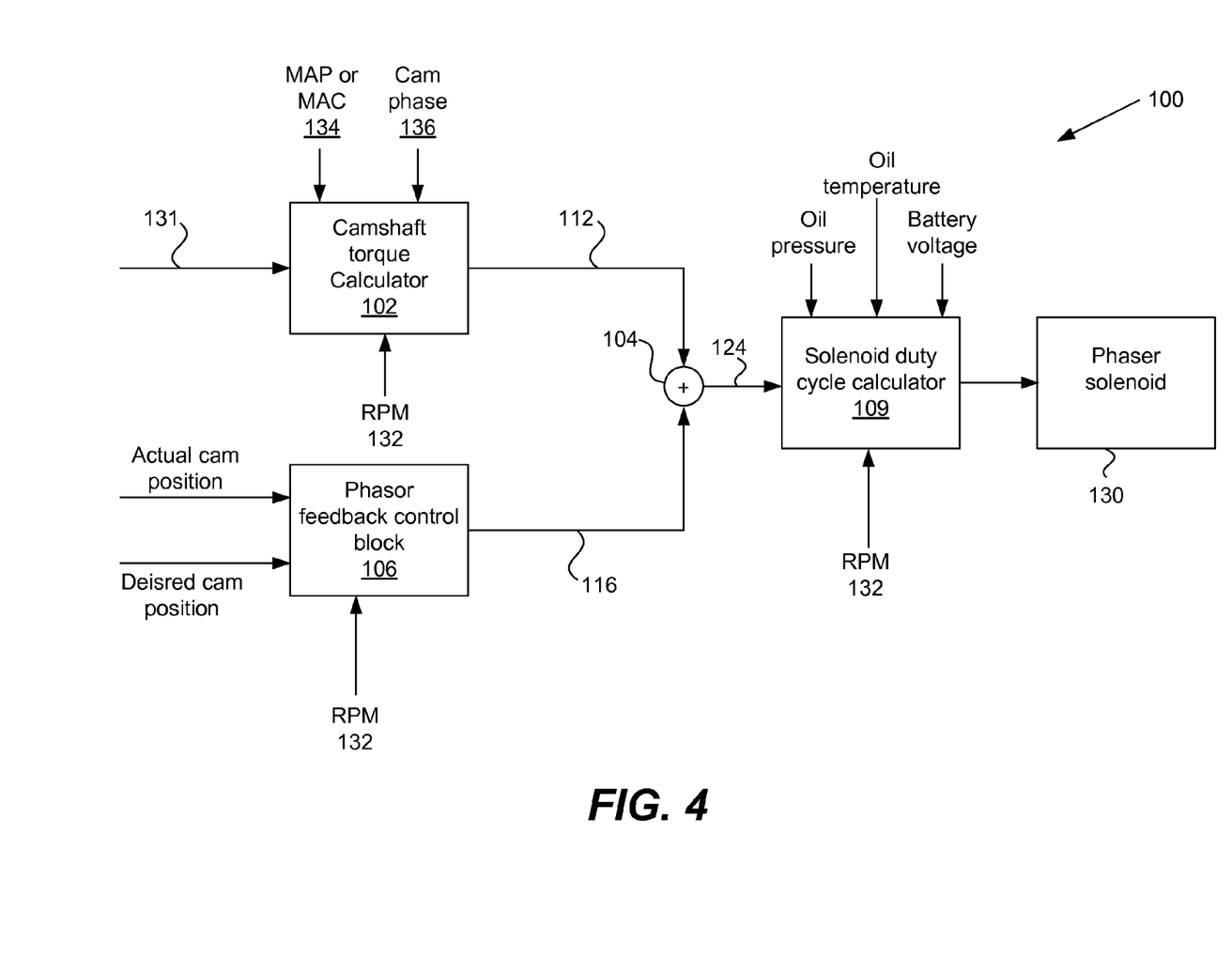
FIG. 4 is functional block diagram of a cam phaser control module in accordance with one described embodiment.

Referring next to FIG. 4, a cam phaser control module 100 in accordance with one embodiment of the present invention will be described. In the illustrated embodiment, oil pressure within the phaser cavity is modulated in a manner that holds the internal vanes of the cam phaser and therefore the rotational phase of the camshaft relatively steady through the course of camshaft torque variations at a consistent commanded camshaft position. More specifically, the hydraulic pressure within the phaser cavity is controlled in a manner that tracks the torque variations exerted on the camshaft during skip fire operation to counteract the effects of such variations, thereby holding the internal vanes (and thus the camshaft) relatively steady in the face of the transitory torque variations. Reducing the oscillations in the camshaft position reduces variation in the air charge introduced into the cylinders thereby facilitating improved fueling accuracy and torque prediction.

In the illustrated embodiment, cam phaser control module 100 includes camshaft torque calculator 102, an adder 104, phaser feedback control block 106 and solenoid duty cycle calculator 109. The camshaft torque calculator 102 is arranged to calculate the expected camshaft torque based on the current operational state of the engine using the engine controller's knowledge of the expected skip fire firing sequence and valve actuation strategy. The camshaft torque calculator 102 then determines a torque adjustment 112 that represents the torque differential between a baseline torque that would ordinarily be expected to provide the desired camshaft phase and the calculated torque at any given point.

In parallel, phaser feedback control block 106 determines a baseline phaser torque 116 that would be appropriate to position the phaser vane at the commanded camshaft advance angle. The phaser feedback control block uses feedback of any detected phaser position error (relative to the commanded camshaft advance) in the determination of the baseline phaser torque 116. Thus, the phaser feedback control block 106 may operate in substantially the same manner as a conventional cam phaser controller in the determination of the baseline phaser torque 116. When the engine controller (e.g., an ECU) determines that changes in the cam advance/retard setting is warranted, the engine controller informs the phaser control block which takes the new desired cam advance/retard setting into account when calculating the baseline phaser torque 116. Thus, changes in the cam advance/retard can be commanded in a substantially conventional manner.

The torque adjustment 112 determined by camshaft torque calculator 102 and the baseline phaser torque determined by phaser feedback control block 106 are then summed together as represented by adder 104 to determine the needed phaser torque 124. Duty cycle calculator 109 utilizes the needed phaser torque 124 to determine the appropriate duty cycle to apply to phaser solenoid 130 to control the pressure within the phaser cavity appropriately to hold the camshaft substantially in place through variations in the net torque applied to the camshaft. The response of the cam phaser control module 100 is preferably rapid enough to adjust the pressure within the phaser cavity rapidly enough to relatively closely follow camshaft torque variations.

Since the camshaft torque can vary significantly over the course of a firing opportunity, it is preferable that the phaser solenoid duty cycle be varied over the course of the firing opportunity in a similar manner. This can be accomplished in a variety of ways. For example, since the camshaft torque profile associated with any particular firing opportunity can be determined when the firing/valve actuation decisions are known, the torque profile can typically be calculated on a firing opportunity by firing opportunity basis. With this feed-forward approach, the torque adjustment 112 and the phaser torque 124 can be provided in terms of the time-varying torque profile that is desirable over the course of a particular firing opportunity. The Solenoid duty cycle calculator 109 is then arranged to implement the requested profile.

In other embodiments a similar effect can be accomplished by updating the torque adjustment 112 and the phaser torque 124 calculations at a frequency sufficient to reasonably follow expected torque variations. When this approach is taken, from a feed forward control standpoint it would typically be desirable to update the torque adjustment 112 and the phaser torque 124 calculations at a frequency much higher than the frequency of the firing opportunities. By way of example, when such an approach is used, updating the torque adjustment and phaser torque calculations at a rate firing of at least 10 times the frequency of the firing opportunities would be preferable, and much higher update frequencies are desirable. To give a sense of scale of the response time, consider that an 8 cylinder engine operating at 3000 RPM will have 200 firings opportunities per second resulting in a firing opportunity every five milliseconds. Of course, higher operational engine speeds are typically possible with correspondingly higher firing opportunity frequencies. Accordingly, in order to effectively make hydraulic pressure changes at a frequency of greater than 10× the rate of the firing opportunities, the response time of the cam phaser control module 100 would have to be significantly less than 0.5 ms in order to account for all possible engine speeds. Such response times are readily obtainable using conventional processors and other electronic components. With such control, the camshaft phase can be held relatively stable at a designated cam advance/retard setting) such that the valve timing will remain substantially constant through skip fire operation of the engine.

It should be appreciated that during steady state operation, the more closely the net phaser torque applied by hydraulic pressure within the phaser cavity tracks torque variations applied by the valves, etc. during rotation of the camshaft, the more steady the camshaft phase will be held during operation. However, it is not imperative that the hydraulic pressure within the phaser cavity exactly and precisely tracks all the camshaft torque variations. Rather, significant improvements in camshaft phase stability and the corresponding fuel efficiency and/or emissions improvements can be obtained by having the hydraulic pressure within the phaser cavity reasonably track the major torque variations.

Referring again to FIG. 4, the firing sequence 131 and/or other engine events (such as desired intake and exhaust valve timing) and the engine operating characteristics deemed appropriate to determine torque applied to the camshaft such as the engine speed (RPM) 132, the mass air charge (MAC) or manifold absolute pressure (MAP) 134 and the current or commanded cam phase 136 are input to the camshaft torque calculator 102. The camshaft torque calculator 102 dynamically determines the expected camshaft torque based on these inputs. In various embodiments, the expected camshaft torque may be determined algorithmically, through the use of lookup tables, using discrete logic, using a combination of algorithms and lookup tables, or through any other suitable approach. It should be appreciated that the appropriate camshaft torque calculation model will vary from engine design to engine design. However, those familiar with adjustable camshaft phase control are well suited to determine the specific calculations that are most appropriate for any particular engine design.

It should be appreciated that the calculation of the torque adjustment 112 by the camshaft torque calculator 102 is a feed forward approach to controlling the cam phaser which works particularly well in skip fire applications where the firing fraction and/or the valve actuation strategy may be changed frequently and/or determined dynamically during operation of the engine.

In the embodiment illustrated in FIG. 4, it was assumed that the skip fire controller is arranged to operate the valves in a manner in which the intake and exhaust valves are opened in the normal sequence during "fired" working cycles and are both held closed through skipped working cycles. In such circumstances, the firing sequence 131 alone may be sufficient to define the most relevant valve related engine events. However, some skip fire control approaches contemplate other types of valve control and in such cases it may be desirable to inform the camshaft torque calculator 102 of all of the valve actuation events. For example, if an exhaust valve is not always opened after a combustion event, a "high pressure exhaust gas spring" may be created within the cylinder combustion chamber by the combustion gases and the timing of the exhaust valve opening may be delayed from immediately after the combustion event to a later working cycle. In another example particularly relevant to direct injection engines, an intake valve may be opened in a working cycle in which no fueling or combustion occurs so that an air charge is trapped within the combustion chamber during a skipped working cycle. In such cases there may be an intake valve opening in a skipped working cycle and no intake valve opening in a fired working cycle. In still other circumstances sometimes referred to as "reexhaust" it may be desirable to open the exhaust valve in the normal course after the firing of a cylinder and to reopen the exhaust valve in any skipped working cycle that immediately precedes an active (fired) working cycle resulting in an extra exhaust valve opening event. In still other implementations, reexhaust may be employed at the end of every skipped working cycle. Of course, a variety of other valve timing schemes may be applied as well and it should be apparent that the timing and magnitude of the forces applied to the camshaft by the opening and closing of the valves will significantly affect the torque applied to the camshaft and therefore it is desirable for the camshaft torque calculator 102 to have sufficient information to know or be able to determine the intake and exhaust valve opening events.

It is also desirable for the camshaft torque controller to have knowledge of factors that might affect the magnitude of the forces applied during the opening and closing of the valves. In engines which have adjustable valve lift this would include the valve lift setting. In engines that include more than one cam lobe suitable for actuating any particular valve, it would include knowledge of the selected cam lobe. In engines that have multiple independently actuatable exhaust valves or multiple independently actuatable intake valves, it would include an indication of or the ability to determine which valves are being actuated during any particular valve opening event.

Additionally, it is desirable that the camshaft torque calculator 102 receive the values of any engine operating parameters that are used in the camshaft torque calculations. As will be appreciated by those familiar with the art, a variety of different parameters and formulas may be used in the torque calculation. By way of example, the engine speed 132, the intended or actual camshaft phase 136 and an indication of either the mass air charge (MAC) or manifold absolute pressure (MAP) 134 are used as inputs in the illustrated embodiment. However, it should be appreciated that other inputs may be used in the torque determination in addition to and/or in place of these parameters in other embodiments.

It should also be appreciated that the control module described with respect to FIG. 4 can readily be implemented in a wide variety of manners including, for example, algorithmically by a processor, through the use of look-up tables based on selected operational requirements, through the use discreet logic (analog or digital) or by a combination of techniques.

Although the invention has been described primarily in the context of controlling the hydraulic pressure within a cam phaser during skip fire engine control, similar techniques can be used to reduce camshaft jitter during normal (all cylinder) operation of an engine that incorporates a cam phaser. Camshaft jitter can be reduced by applying exactly the same type of phaser cavity hydraulic pressure control as described with respect to FIG. 4. As will be appreciated by those familiar with the art, electric-based phasers are also sometimes used to control the camshaft phase. It should be apparent that the described techniques are equally applicable to electric-based phasers.

Furthermore, the dynamic tracking of the camshaft torque accomplished by the camshaft torque calculator 102 can be quite useful in a variety of other valve control applications as well. For example, such tracking can be used in the control of rocker arm based valve actuation duration control devices, or in the selection of the desired cam lobe in multi-lobe camshafts such as VTEC or VVTI-L. In another example, more accurate knowledge of the instantaneous torque applied to the camshaft can be used to improve the response to commanded camshaft phase changes. This is particularly useful in skip fire control type of applications where the camshaft torque tends to vary significantly at more irregular intervals. In still other applications, the dynamic tracking of camshaft torque can be used to estimate the actual cam advance/retard at specific intake and exhaust events during operation of an engine with variable valve timing. Such estimates can then be used in an air model that determines the mass air charge (MAC) to help determine the proper fuel charge to inject for any particular firing opportunity.

Therefore, the present embodiments should be considered illustrative and not restrictive and the invention is not to be limited to the details given herein, but may be modified within the scope and equivalents of the appended claims.

What is claimed is:

1. A method of controlling the phase of an adjustable phase camshaft relative to a crankshaft of an engine, wherein the adjustable phase camshaft is utilized to actuate at least one engine valve, the method comprising utilizing knowledge of at least one of:

(i) firing events in a skip fire firing sequence, and
(ii) dynamically determined valve actuation events, in the control of a cam phase adjustment device in a manner that maintains the phase of the adjustable phase camshaft more stable at a consistent commanded camshaft position through transitory variations in torque applied to the adjustable phase camshaft by the actuation of the at least one engine valve than would occur without such control.

2. A method as recited in claim 1 wherein the cam phase adjustment device is a cam phaser and the knowledge of at least one of the firing events and the dynamically determined valve actuation events is used in the control of hydraulic pressure within a chamber of the cam phaser.

3. A method as recited in claim 2 wherein the hydraulic pressure is varied in a manner that helps stabilize the phase of the adjustable phase camshaft through transitory variations in torque applied to the camshaft by the actuation of the at least one engine valve than would occur without the variations in hydraulic pressure.

4. A method as recited in claim 1 wherein the phase control is performed while the engine is operated in a skip fire manner with valve deactivation.

5. A method as recited in claim 4 wherein the timing of the dynamically determined valve actuation events is determined based at least in part on information regarding directed firing events and the dynamically determined valve actuation event timing is used in the control of hydraulic pressure within a cam phaser.

6. A method as recited in claim 2 further comprising:
dynamically determining an estimated applied camshaft torque that accounts for camshaft torques imparted by the actuation of the at least one engine valve; and
adjusting the hydraulic pressure within the chamber based at least in part on the estimated applied camshaft torque in order to counteract variations in the torque applied by the actuation of the at least one engine valve.

7. A method of dynamically tracking reactionary torque applied to a camshaft during operation of an engine, the method comprising:
receiving an indication of at least one of (i) a skip fire firing sequence, and (ii) a sequence of engine events that include at least valve actuation events; and
dynamically determining an estimated reactionary torque applied to the camshaft during operation of the engine, wherein the determined reactionary torque tracks and accounts for transitory torque variations imparted by the actuation of the at least one engine valve actuated by the camshaft during operation of the engine.

8. A method as recited in claim 7 wherein the estimated applied camshaft torque is used in the control of variable timing of the at least one engine valve actuated by the camshaft during operation of the engine.

9. A method as recited in claim 7 wherein the estimated applied camshaft torque is used in the control of a hydraulic pressure within a chamber of a cam phaser during engine operation.

10. A method as recited in claim 9 wherein the hydraulic pressure is varied in a manner that maintains the phase of the camshaft more stable through transitory variations in torque applied to the camshaft by the actuation of the at least one engine valve than would occur without the variations in hydraulic pressure.

11. A method as recited in claim 10 wherein the hydraulic pressure control is performed while the engine is operated in a skip fire manner with valve deactivation.

12. A cam phaser control module for controlling hydraulic pressure within a cam phaser cavity in order to control a phase of a camshaft during operation of an engine, the cam phaser control module comprising:
a camshaft torque calculator arranged to dynamically determine the torque applied to a camshaft during operation of the engine; and
a phaser solenoid duty cycle controller that modulates the hydraulic pressure within the cam phaser cavity over the course of an engine cycle based at least in part upon the dynamically determined torque in a manner that counteracts transient torque variations caused by actuation of valves that occur during operation of the engine over the course of the engine cycle.

13. A cam phaser control module as recited in claim 12 wherein the camshaft torque calculator is arranged to dynamically determine the torque applied to the camshaft during skip fire operation of the engine.

14. A cam phaser control module as recited in claim 13 wherein the phaser solenoid duty cycle controller is arranged to modulate the hydraulic pressure within the cam phaser cavity in a manner that helps stabilize the camshaft phase through transient variations in torque applied to the camshaft due to the actuation of valves driven by the camshaft during operation of the engine while operating at a consistent commanded camshaft position.

15. A cam phaser control module as recited in claim 12 wherein the phaser solenoid duty cycle controller is arranged to modulate the hydraulic pressure within the cam phaser cavity in a manner that helps offset transient variations in torque applied to the camshaft due to the actuation of valves driven by the camshaft while operating at a consistent commanded crankshaft position.

* * * * *